US007706936B2

(12) United States Patent
Krzystofczyk et al.

(10) Patent No.: US 7,706,936 B2
(45) Date of Patent: Apr. 27, 2010

(54) METHOD AND SYSTEM FOR ADAPTIVELY MODIFYING DIAGNOSTIC VEHICLE INFORMATION

(75) Inventors: Carl J. Krzystofczyk, Mount Prospect, IL (US); Sunil Reddy, Corpus Christi, TX (US); Brad Lewis, Gilroy, CA (US)

(73) Assignee: Snap-on Incorporated, Kenosha, WI (US)

( * ) Notice: Subject to any disclaimer, the term of this patent is extended or adjusted under 35 U.S.C. 154(b) by 607 days.

(21) Appl. No.: 11/211,104

(22) Filed: Aug. 24, 2005

(65) Prior Publication Data

US 2007/0055420 A1 Mar. 8, 2007

(51) Int. Cl.
*G01M 17/00* (2006.01)

(52) U.S. Cl. .............................. 701/29; 701/35; 701/33

(58) Field of Classification Search ................... 701/29, 701/31, 35

See application file for complete search history.

(56) References Cited

U.S. PATENT DOCUMENTS

| | | | | |
|---|---|---|---|---|
| 4,418,338 A | | 11/1983 | Burt | 340/578 |
| 4,418,388 A | | 11/1983 | Allgor et al. | 364/431.1 |
| 4,658,370 A | | 4/1987 | Erman et al. | 364/513 |
| 4,796,206 A | * | 1/1989 | Boscove et al. | 701/99 |
| 5,250,935 A | | 10/1993 | Jonker et al. | 345/134 |
| H1273 H | | 1/1994 | Novick | 434/224 |
| 5,337,320 A | | 8/1994 | Kung | 371/15.1 |
| 5,442,549 A | * | 8/1995 | Larson | 701/35 |
| 5,533,093 A | * | 7/1996 | Horton et al. | 379/21 |
| 5,633,197 A | | 5/1997 | Lur et al. | 438/668 |
| 5,835,871 A | | 11/1998 | Smith et al. | 701/29 |
| 5,848,365 A | * | 12/1998 | Coverdill | 701/35 |
| 5,953,681 A | * | 9/1999 | Cantatore et al. | 702/31 |
| 6,141,608 A | * | 10/2000 | Rother | 701/33 |
| 6,216,139 B1 | * | 4/2001 | Listou | 715/209 |
| 6,236,917 B1 | | 5/2001 | Liebl et al. | |
| 6,334,081 B1 | * | 12/2001 | Robinson et al. | 701/48 |
| 6,430,485 B1 | * | 8/2002 | Hullinger | 701/33 |
| 6,505,106 B1 | | 1/2003 | Lawrence et al. | |
| 6,556,217 B1 | * | 4/2003 | Makipaa et al. | 345/667 |

(Continued)

FOREIGN PATENT DOCUMENTS

EP 0 428 135 5/1991

(Continued)

OTHER PUBLICATIONS

Beck et al., "IBM Websphere Everyplace Suite v1.1." [Online] Sep. 12, 2002, p. 1-34, URL:http://wiki.daimi.au.ke/pca/_files/wes.pdf.

(Continued)

*Primary Examiner*—Mark Hellner
*Assistant Examiner*—Helal A Algahaim
(74) *Attorney, Agent, or Firm*—McDonnell Boehnen Hulbert & Berghoff LLP

(57) ABSTRACT

A method and system for adaptively modifying diagnostic vehicle information is provided. A system can automatically optimize default OEM diagnostic vehicle information by recognizing when to make text and non-text modifications within the information. Manual changes that are made once can be learned and used over and over again. Modifications may be made based on a desired use of the diagnostic vehicle information.

13 Claims, 4 Drawing Sheets

U.S. PATENT DOCUMENTS

| | | | | |
|---|---|---|---|---|
| 6,580,953 | B1 * | 6/2003 | Wiebe et al. | 700/86 |
| 6,807,469 | B2 * | 10/2004 | Funkhouser et al. | 701/33 |
| 6,859,696 | B2 * | 2/2005 | Schade et al. | 701/29 |
| 7,092,937 | B2 * | 8/2006 | Morgan et al. | 707/3 |
| 2002/0073235 | A1 * | 6/2002 | Chen et al. | 709/246 |
| 2003/0055762 | A1 * | 3/2003 | Holt | 705/36 |
| 2003/0216889 | A1 * | 11/2003 | Marko et al. | 702/182 |
| 2004/0054821 | A1 * | 3/2004 | Warren et al. | 710/8 |
| 2004/0199542 | A1 | 10/2004 | Morgan et al. | |
| 2005/0182824 | A1 * | 8/2005 | Cotte | 709/217 |

FOREIGN PATENT DOCUMENTS

| | | |
|---|---|---|
| EP | 991 0 8097.9 | 4/2002 |
| JP | 2004 139318 | 5/2004 |
| WO | WO 2004/083990 | 9/2004 |

OTHER PUBLICATIONS

International Search Report for PCT/US2006/011229.

* cited by examiner

METHOD AND SYSTEM FOR ADAPTIVELY MODIFYING DIAGNOSTIC VEHICLE INFORMATION

BACKGROUND

1. Field of the Application

This application relates generally to test and diagnostic systems for machines or other operating equipment. More particularly, the application relates to an automated process for optimizing diagnostic vehicle information. While the application is described in the context of a vehicle diagnostic system and method, the principles of the present application are equally applicable for air conditioning testing and servicing systems, wheel systems, as well as for various non-automotive apparatus.

2. Description of the Related Art

Automotive vehicles are becoming highly computerized products. Consequently, a number of different types of diagnostic tools have been used to assist in diagnosis and repair of fault conditions in automotive vehicles. Such diagnostic tools can typically be connected to an on-board computer of a vehicle in order to download and analyze vehicle operational information from the on-board computer. For example, a diagnostic tool may obtain information about a vehicle's engine, transmission, mechanical systems, air conditioning systems, braking system, power system, or any other system.

Diagnostic tools often utilize information in the form of diagnostic trees, which are created by Original Equipment Manufacturers (OEMs). Diagnostic tools typically allow a user to enter information, including fault symptoms, into the diagnostic tool to be used instead of or in conjunction with the information downloaded from the vehicle's on-board computer to diagnose and assist in the repair of fault conditions in the vehicle.

A number of different types of diagnostic tools have been used, such as engine analyzers, which are designed to monitor a variety of operating conditions of an internal combustion engine, and scanners for downloading data from vehicle on-board computers. In addition, diagnostic tools may include laboratory-type tools like oscilloscopes, digital volt-Ohm meters (DVOM) and the like.

Any of these diagnostic tools may be used with a computer-based diagnostic platform that permits a fault-based drivability diagnosis of a vehicle. The platform may present a user with a menu of problems indicated, e.g., by symptoms or service codes, and the user selects those problems that are pertinent to the vehicle under test. Based upon the selected faults, the system then presents the user with a list of tests to be performed to diagnose the cause or causes of the faults. The tests can be listed in the order in which they would most likely be effective in diagnosing the vehicle faults, based upon manufacturer's information and previous repair and diagnosis experience with this type of vehicle, for example.

Manufacturers create diagnostic trees to illustrate the tests for their vehicles on an annual basis, such as for individual Year/Make/Model combinations. A menu of problems and diagnostic trees can include a standard list of symptoms to be used for all vehicles since vehicles use common technology. For example, all vehicles have mechanical, ignition, fuel, and computer components that function in roughly the same manner. A standard list of symptoms is used because it provides a consistent interface and diagnostic philosophy for all vehicles, and promotes technician and service writer familiarization. Other more specific symptoms can then be assigned to specific vehicles for which particular problems are known to exist.

The diagnostic vehicle information from the manufacturers can be uploaded directly to an diagnostic device. However, for many types of devices, the information will be unoptimized for the specific output (e.g., the original text may have more value if it is shortened for a handheld device, or enhanced with animation for a PC-based information system, or enhanced with pictures or additional text for a printed manual).

As a result, experts may attempt to modify the diagnostic vehicle information to conform to a particular type of output, such as a handheld diagnostic unit, a PC-based information program, a printed manual, etc. Thus, an automotive expert will manually modify automotive diagnostic code tips within the diagnostic trees, repair procedures, component operations, testing processes and other similar functions for all possible types of diagnostic tools or output representations.

In practice, the amount of information that an expert processes is generally large, resulting in a large amount of manual manipulation, and a large amount of time being spent to modify information into its final form for use. The time element increases a cost of the product and slows a production schedule and potential release dates. As a result, a method for automatically modifying diagnostic vehicle information is desirable.

SUMMARY

According to the present application, a method for generating a library of diagnostic vehicle information is provided. The method includes receiving diagnostic vehicle information including at least one procedure for diagnosing a cause of a fault that can be experienced by an apparatus under diagnosis and identifying modifications that have been made to the diagnostic vehicle information. The method also includes storing in a library of transformations the modifications made to the diagnostic vehicle information, and for each modification, identifying a reason for making the modification within the diagnostic vehicle information, and further storing in the library of transformations an identifier for each modification indicating the reason.

In another aspect, the method includes receiving diagnostic vehicle information including at least one procedure for diagnosing a cause of a fault that can be experienced by an apparatus under diagnosis and identifying an intended output type for which the diagnostic vehicle information will be used. The method further includes searching within a library for modifications to make to the diagnostic vehicle information, and presenting a user with suggested modifications to make to the diagnostic vehicle information.

Still further, in another aspect, the method includes receiving diagnostic vehicle information including at least one procedure for diagnosing a cause of a fault that can be experienced by an apparatus under diagnosis, identifying an intended output type for which the diagnostic vehicle information will be used, and identifying within a library modifications to make to the diagnostic vehicle information. The method also includes for identified modifications, determining modification statistics that indicate whether a modification should be accepted based on past experience, and based on the modification statistics, modifying the diagnostic vehicle information according to the identified modifications.

As a result, modifications within original OEM diagnostic vehicle information may take place automatically by a system that can execute a search and comparison routine to perform a text string versus substitution meta-tag comparison on text and picture items, and then automatically replace them; or manually, in which a developer may go through each page of diagnostic vehicle information on a display device and rewrite or use suggested instructions to modify the information.

These as well as other features, advantages and alternatives will become apparent to those of ordinary skill in the art by reading the following detailed description, with appropriate reference to the accompanying drawings.

DETAILED DESCRIPTION OF EXEMPLARY EMBODIMENTS

Computerized diagnostic systems are becoming pervasive in several industries. This is true of the automotive industry, in which computers are increasingly relied upon for the running, maintenance, and repair of motor vehicles. Computerized diagnostic systems rely upon external and internal computers to assist technicians in diagnosing problems with vehicles, as such systems receive, analyze, and provide data feedback to and from computers in vehicles to better diagnose problems.

I. Exemplary Diagnostic System Architecture

Figure 1:
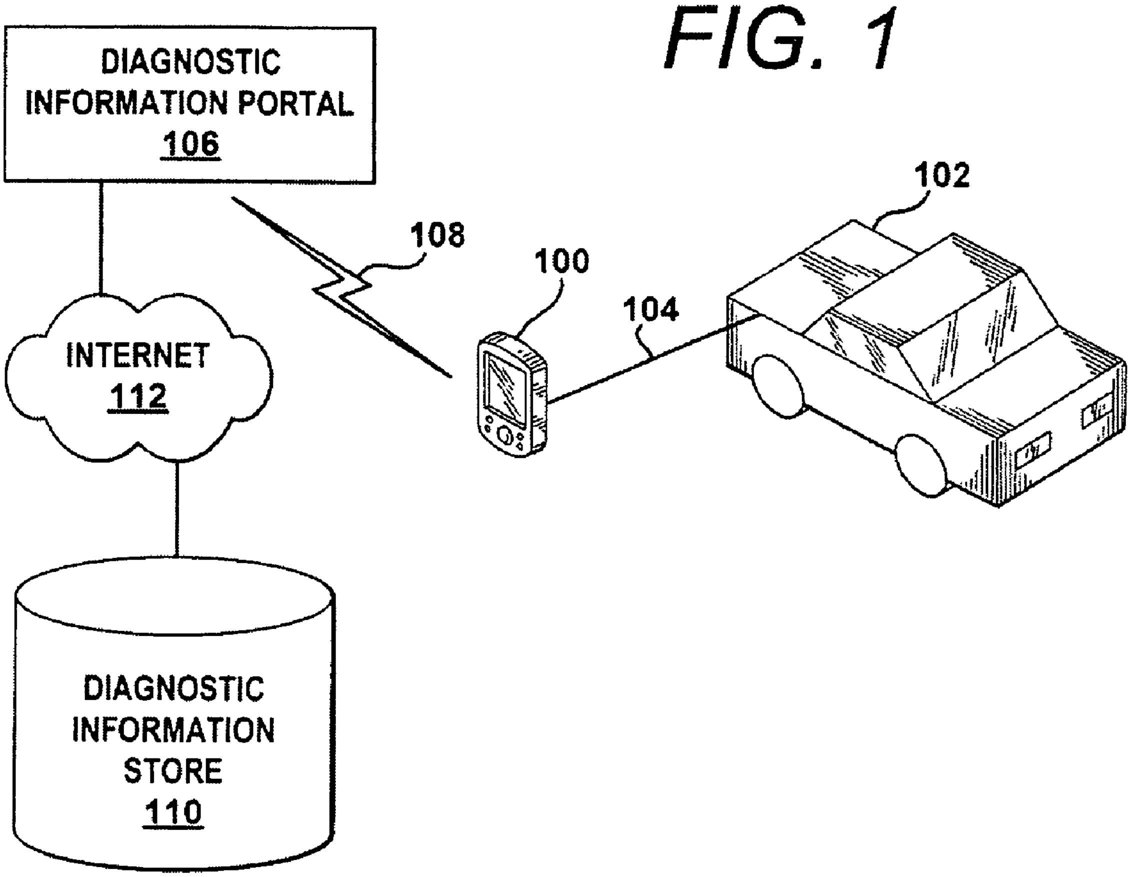
FIG. 1 is a block diagram illustrating one example of a system using a diagnostic information portal to provide enhanced vehicle diagnostics.

FIG. 1 is a block diagram of an exemplary system using a diagnostic information portal to provide enhanced vehicle diagnostics. As illustrated, a diagnostic tool 100 interfaces with a vehicle 102 via a wired connection 104. The diagnostic tool 100 may be various types of devices used by a vehicle repair technician. For example, the diagnostic tool 100 may comprise a personal digital assistant (PDA) or other handheld device. Alternatively, the diagnostic tool 100 may comprise a desktop computer, a laptop computer or some other type of diagnostic equipment. One example of a diagnostic tool includes a vehicle analyzer system, such as the engine analyzer system disclosed in U.S. Pat. No. 5,250,935, which is herein incorporated in its entirety by reference, as if fully set forth in this description. Also, while FIG. 1 depicts the diagnostic tool 100 interfacing with the vehicle 102 through the wired connection 104, a wireless connection might alternatively be used.

The diagnostic tool 100 interfaces with the vehicle 102 to collect diagnostic information about the vehicle 102. The information is often in the form of diagnostic trees, which are created by the Original Equipment Manufacturer (OEM) of the vehicle. For example, a number of outside vendors, e.g., Original Equipment Managers (OEM), exist from which car manufacturers buy many of their parts. OEMs provide flowcharts or diagnostic trees indicating instructions to diagnose a fault experienced by automotive vehicles. Thus, the diagnostic trees can be used to diagnose a problem with the vehicle 102. Diagnostic vehicle information may specifically include information relating to faults that may be experienced by a vehicle under diagnosis, tests that may be performed on the vehicle for the purpose of diagnosing the cause of the faults, and/or a solution that may be used to correct the faults. Although FIG. 1 depicts the vehicle 102 as a car, the principles discussed herein are applicable to many types of vehicles. The principles are also applicable to non-vehicles, such as machinery, industrial equipment or other objects that might need to be diagnosed and repaired.

The diagnostic tool 100 may interface with one or more systems within the vehicle 102 to obtain diagnostic information about those systems. For example, the diagnostic tool 100 might obtain information about the vehicle's engine, transmission, electrical systems, air conditioning system, braking system, power steering system or any other systems. The diagnostic tool 100 might interface directly with these various systems, as is illustrated in FIG. 1. Alternatively, the diagnostic tool 100 might interface with other diagnostic equipment (not shown), which in turn interfaces with various systems or components in the vehicle 102. Other configurations are also possible.

Depending on the vehicle 102 and the particular configuration of the diagnostic tool 100 or other equipment, the diagnostic tool 100 may automatically obtain information about the various systems in the vehicle 102. That is, the diagnostic tool 100 might obtain this information automatically upon being connected to the vehicle 102 or upon an appropriate prompt from a user of the diagnostic tool 100. An automated process such as this allows a vehicle repair technician to quickly and efficiently obtain diagnostic information about various systems in the vehicle 102.

The vehicle repair technician might also manually direct the diagnostic tool 100 to perform various tests on the vehicle 102 or to acquire certain other diagnostic information about the vehicle 102. This might be in addition to or in place of the previously described automated diagnostic information collection methods. Thus, the diagnostic tool 100 might automatically collect predetermined data, might collect additional data as directed by the vehicle repair technician, or might perform a combination of these methods to acquire the diagnostic information.

Currently, the vehicle repair technician might manually input to the diagnostic tool 100 information about a problem with the vehicle 102 or a modification to the OEM diagnostic tree. For example, the vehicle repair technician might input a description of the problem, such as by typing a description of the problem into the diagnostic tool 100 or by selecting one or more problems from a drop-down menu or some other preprogrammed selection of possible problems. The vehicle repair technician might also input possible causes of the problem into the diagnostic tool 100 or might eliminate possible causes of the problem, for example, in the instance where the vehicle repair technician has already performed some tests or ruled out some possible causes. The vehicle repair technician might additionally enter other information about the vehicle 102, such as its VIN, its make and model, or other identifying information. Alternatively, a technician may evaluate and modify the branches of an OEM diagnostic tree. This information might be collected automatically by the diagnostic tool 100 when it is connected to the vehicle 102.

Once the diagnostic tool 100 acquires the diagnostic information from the vehicle 102 and additional information if any is entered by the vehicle repair technician, the diagnostic tool 100 may then formulate a request to a diagnostic information portal 106. The diagnostic information portal 106 can provide a centralized location for vehicle repair technicians, through the use of diagnostic tools, to submit diagnostic information and to in return obtain possible causes of problems with their vehicles. The diagnostic information portal 106 can be located at the vehicle repair technician's worksite and be used by multiple vehicle repair technicians at that worksite. Alternatively, the diagnostic information portal 106 can be located at a more central location and might then be accessed by vehicle repair technicians a multiple different worksites. Thus the diagnostic information portal 106 might communicate with multiple diagnostic tools, although FIG. 1 illustrates only a single such device.

The diagnostic tool 100 preferably communicates with the diagnostic information portal 106 over a wireless communication link 108; however, a wired link or a combination of wired and wireless links might alternatively be used. The wireless communication link 108 can use a variety of different wireless protocols, such as the protocols under the Institute of Electrical and Electronics Engineers ("IEEE") 802.11 umbrella, IEEE 802.16, IEEE 802.20, Bluetooth, code division multiple access ("CDMA"), frequency division multiple access ("FDMA"), time division multiple access ("TDMA"), Global System for Mobile Communications/General Packet Radio Service ("GSM/GPRS"), Bluetooth or others. Furthermore, data from the portal 106 may be precompiled and installed on the diagnostic tool 100.

In formulating the request, the diagnostic tool 100 might include the diagnostic information received from the vehicle 102. Alternatively, the diagnostic tool 100 might only include part of the diagnostic information received from the vehicle 102, such as that information most directly related to the problem or modification. The request might additionally include information about the make, model, year, VIN or other identifying information for the vehicle 102, and the request might also additionally include information entered by the vehicle repair technician.

The diagnostic information portal 106 receives the request from the diagnostic tool 100. In response, the diagnostic information portal 106 uses the diagnostic information in the request to search various information sources to determine possible causes for the problem. The diagnostic information portal 106 might itself store these various information sources, such as OEM diagnostic trees, proprietary third party repair procedures, publicly available documentation (e.g., recall notices) or any other information sources than can be used to diagnose problems with the vehicle 102. Alternatively, one or more of the information sources might be stored remotely from the diagnostic information portal 106 in a diagnostic information store 110, which can be accessed by the diagnostic information portal 106 via one or more data networks 112 (e.g., a intranet, a LAN, a WAN, the Internet, etc . . . ).

Once the diagnostic information portal 106 accesses the information sources to determine the possible causes of the problem, the diagnostic information portal 106 can then send a list or other description of the possible causes back to the diagnostic tool 100. The diagnostic tool 100 can in turn display the possible causes of the problem to the vehicle repair technician. Before sending the possible causes back to the diagnostic tool 100, the diagnostic information portal 106 might statistically prioritize the possible causes, so as to alert the vehicle repair technician to the more likely causes of the problem. This may aid the vehicle repair technician in more quickly diagnosing and fixing the problem with the vehicle 102.

While FIG. 1 illustrates a single diagnostic information portal 106, a diagnostic system might include more than one diagnostic information portal. Each diagnostic information portal in the system might communicate one or more diagnostic tools. Thus, it should be understood that the configurations described herein are merely exemplary in nature, and many alternative configurations might also be used.

Figure 2:
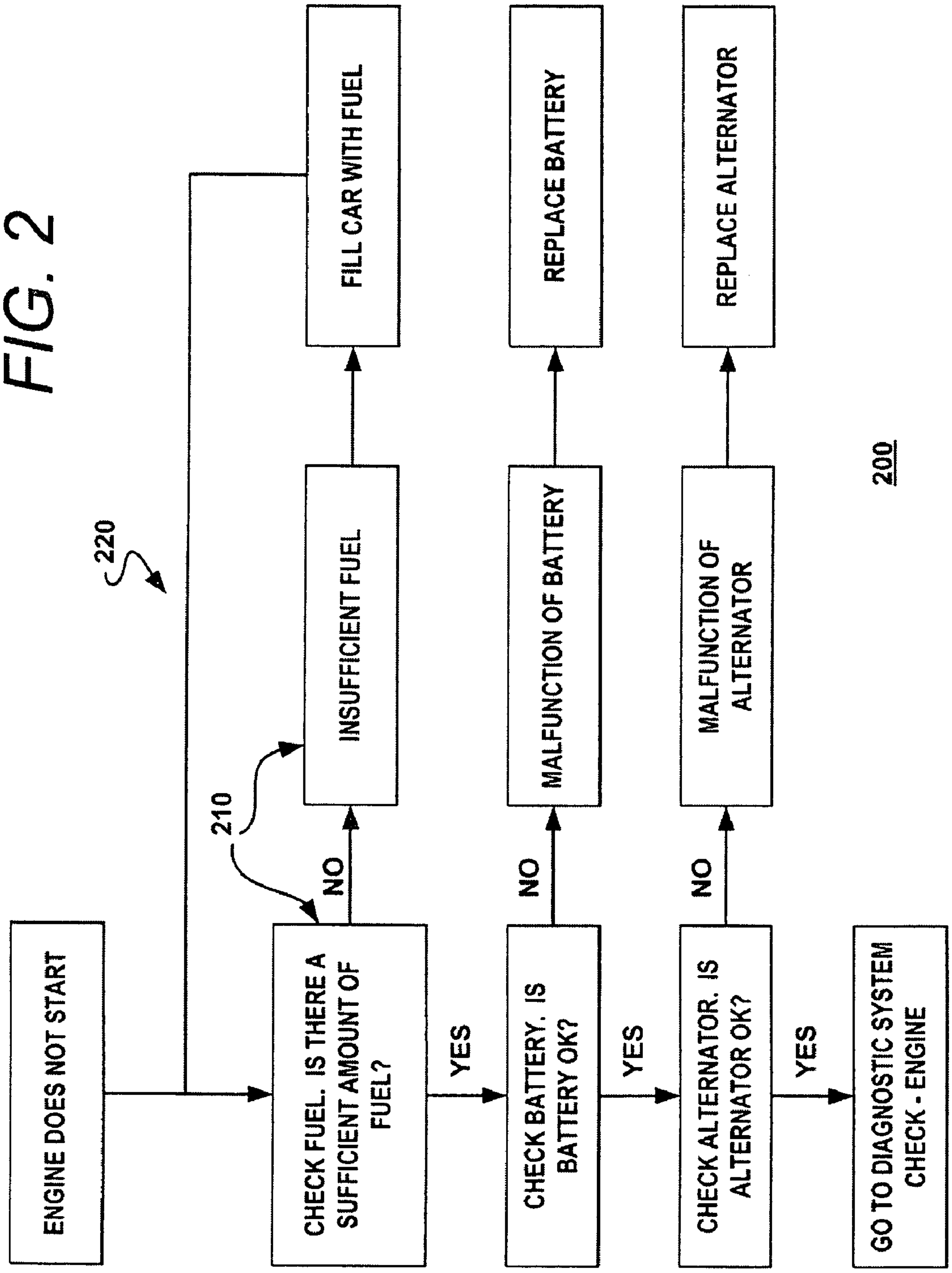
FIG. 2 is a block diagram illustrating one example of diagnostic vehicle information.

FIG. 2 is a block diagram illustrating one example of diagnostic vehicle information, such as an OEM diagnostic tree, that may be used in connection with the diagnostic tool 100 and the system in FIG. 1. The diagnostic tree 200 is a flowchart comprising nodes 210 and branches 220. As shown, the nodes 210 include steps which technicians follow to help them determine both the cause and solution to problems with vehicles, for example. The steps shown in FIG. 2 are examples only, since many other tests or procedures may be performed depending on the type of assessment being conducted.

Table 1, provided below, is another example of diagnostic vehicle information that can be used to diagnose faults within automotive vehicles. Table 1 may represent a diagnostic tree, where the nodes include specific steps and/or indicate equipment to be used by technicians for diagnosing vehicle problems, for example.

TABLE 1

| | Test to be performed (Node) | Value | Yes | No |
|---|---|---|---|---|
| 1 | Did you perform the Diagnostic System Check-Engine Controls? | | Go to Step 2 | Go to Diagnostic System Check - Engine |
| 2 | 1. Connect a scan tool.<br>2.Start the engine and allow the engine to idle.<br>3. Read the fuel composition frequency on the scan tool. Is the reading steady, above the specification? | 155 Hz | Go to Step 5 | Go to Step 3 |
| 3 | 1. Allow the engine to idle.<br>2. Agitate the fuel in the fuel tank by pushing the rear of the vehicle from side to side for 5 seconds.<br>3. Monitor the scan tool fuel composition frequency for 5 minutes.<br>Does the frequency rise above the specification at any time? | 155 Hz | Go to Step 4 | Go to Diagnostic Aids |
| 4 | 1. Turn OFF the engine.<br>2. Relieve the fuel system pressure. Refer to Fuel Pressure Relief Procedure.<br>3. Remove the flexible fuel line from the injector fuel rail.<br>4. Place the flexible fuel line into a suitable container and activate the fuel pump. Collect about 1 liter of fuel and allow the fuel sample to settle.<br>Is any water present in the sample of fuel taken? | | Go to Step 9 | Go to Step 5 |
| 5 | Connect the flexible fuel line to the injector rail.<br>Perform an accuracy test of the J 44175.<br>1. Fill the tester with acetone.<br>2. Connect a DMM to the tester terminals.<br>3. Set the DMM to AC Hertz scale and take a reading.<br>Is the reading within 6 Hz of the specification? | 136 Hz | Go to Step 6 | Go to Step 11 |
| 6 | Important: Drain the acetone completely from the tester. Clean the beaker with a clean dry paper towel before taking a fuel sample. Be careful not to allow fingerprints, sweat, water, or any other outside debris contaminate the fuel | | Go to Step 8 | Go to Step 7 |

TABLE 1-continued

| | Test to be performed (Node) | Value | Yes | No |
|---|---|---|---|---|
| | sample, beaker, tester or fuel gauge as this will cause an error in the test result, leading to a misdiagnosis. 1. Perform a fuel test using the J 44175. 2. Install a fuel pressure gage into the service port located on the rear of the injector rail. 3. Start the engine and open the valve on the fuel pressure gage. Allow enough fuel to pass through the gage to flush any previous fuel from inside the hose. 4. Draw fuel from the fuel pressure gage into the beaker supplied with the test kit. 5. Transfer the fuel from the beaker into the fuel tester. 6. Turn ON the fuel tester and note the red and green LED. | | | |
| * | Is the green LED ON? | | | |
| 7 | Is the red LED ON? | | Go to Step 9 | Go to Step 11 |
| 8 | 1. Connect a DMM to the fuel tester terminals. 2. Set the DMM to the AC Hz scale and take a reading of the fuel sample. 3. Start the engine and monitor the fuel composition frequency on the scan tool. Is the reading from the scan tool and the DMM within the specified amount? | 12 Hz | Go to Step 9 | Go to Step 10 |
| 9 | Connect the flexible fuel line to the injector rail. 1. The fuel is contaminated. 2. Drain the fuel tank. Refer to Fuel Tank Draining Procedure. 3. Replace the fuel with E85 or less. Did you complete the replacement? | | Go to Step 13 | |
| 10 | Replace the FCS. Refer to Fuel Composition Sensor Replacement. Did you complete the replacement? | | Go to Step 13 | |
| 11 | Replace the 9-volt battery and refill with a fuel sample. Is the RED or GREEN led ON? | | Go to Step 5 | Go to Step 12 |
| 12 | The J 44175 has a malfunction. Send tester to a repair facility. Refer to the user manual for shipping and address information. | | | |
| 13 | 1. Use the scan tool in order to clear the DTCs. 2. Turn OFF the ignition for 30 seconds. 3. Start the engine. 4. Operate the vehicle within the Conditions for Running the DTC as specified in the supporting text. Does the DTC run and pass? | | Go to Step 14 | Go to Step 2 |
| 14 | With a scan tool, observe the stored information, Capture Info. Does the scan tool display any DTCs that you have not diagnosed? | | Go to Diagnostic Trouble Code (DTC) List | System OK |

The information in Table 1 is exemplary in nature to illustrate one arrangement of a diagnostic tree. Some of the information in the tree is standard information that is received from the OEM. Additional information may be inserted by an expert after reviewing the tree to provide code tips or suggestions for performing some of the steps. The expert may draw upon his/her experience or observations to provide helpful advice. For example, within step 6 above, the expert may have provided the tip that it is important to drain the acetone completely from the tester, clean the beaker, and not allow fingerprints or outside debris to contaminate the fuel sample, in order to give further guidance to technicians.

II. Exemplary Diagnostic System Operation

Figure 3:
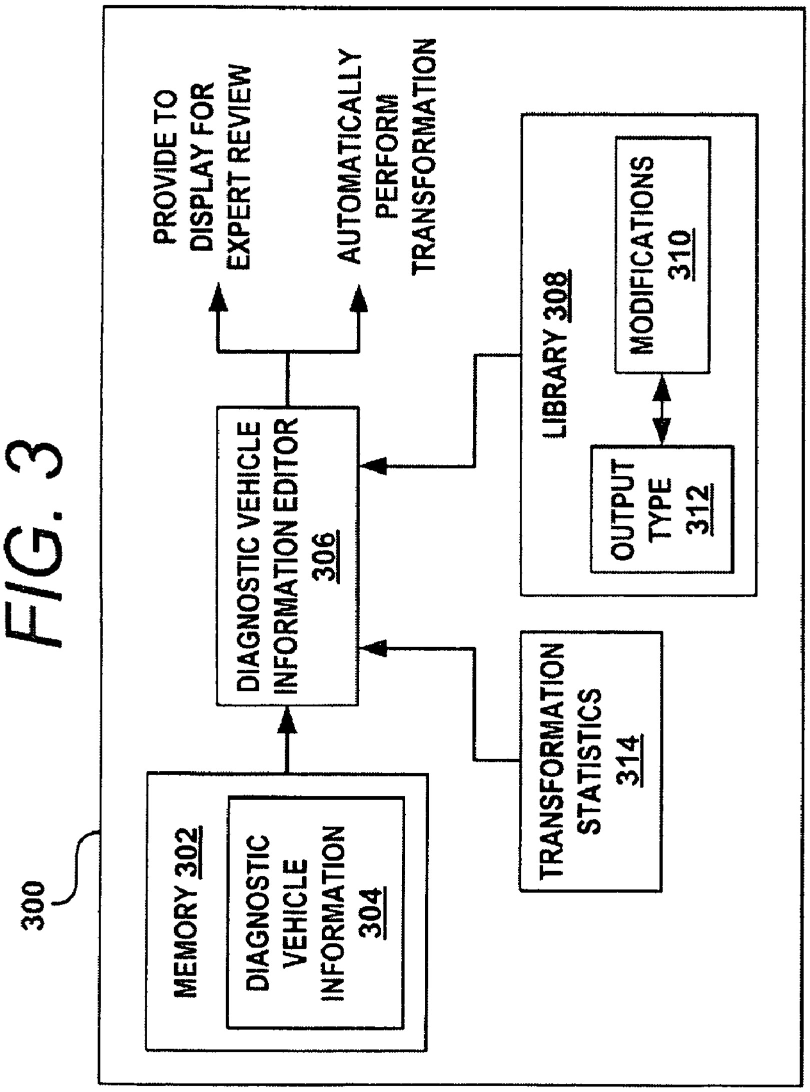
FIG. 3 is a block diagram illustrating one example of a system for modifying diagnostic vehicle information.

Referring to FIG. 3, one example of a system 300 for modifying diagnostic vehicle information, such as that shown in FIG. 2 or Table 1 above, is illustrated. The system 300 may optimize diagnostic vehicle information for a specific output. For example, original text information received from an OEM may have more value if it is shortened to be used for a handheld diagnostic device, or if it is enhanced with animation to be used for a PC-based information system, or if it is enhanced with pictures or additional text to be used for a printed manual. Depending on an intended use of the information, it may be desirable to modify the information accordingly.

The system 300 includes memory 302 for storing OEM diagnostic vehicle information 304, a diagnostic vehicle information editor 306 for evaluating and optimizing the diagnostic vehicle information 304, a library 308 for storing modifications 310 and corresponding information output types 312, and transformation statistics 314 (stored in memory not shown). These elements work together to modify and optimize diagnostic vehicle information for use in a repair shop environment by professional mechanics, for example.

The system 300 can automatically optimize default OEM diagnostic vehicle information by recognizing text and non-text modifications and making substitutions within the information. Manual changes that are made once can be learned and used over and over again. As such, an expert's time can be freed for other tasks since optimization of the information will be processed more quickly. Because less time is spent on massaging the information to be optimized for its destination format, an end user of the information will receive the benefit of reduced costs and/or more up to date information, for example.

Figure 4:
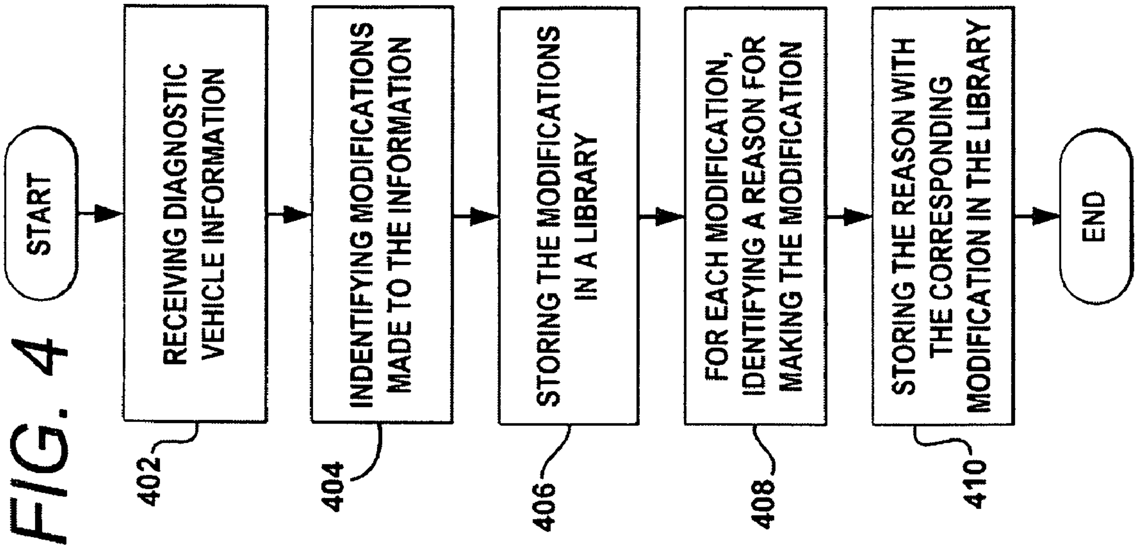
FIG. 4 is a flowchart depicting one embodiment of a method for generating a library of modifications to be used for optimizing diagnostic vehicle information.

FIG. 4 is a flowchart depicting one embodiment of a method for generating a library of modifications (such as library 308) to be used for optimizing diagnostic vehicle information. Initially, as shown at block 402, default diagnostic vehicle information is received, such as that received from an OEM. Next, an expert will review the information and possible make modifications, and the modifications will be noted or stored in a library of output transformations, as shown at blocks 404 and 406. One example of an output transformation is a text word or phrase abbreviation, such as abbreviating the word BLACK as BLK. Note that this method does not assume only text substitution transformations, but can also includes enhancements such as adding pictures or animations, including hypertext links, or other appropriate modifications to the diagnostic vehicle information. The specific modifications may take any form.

Next, a reasoning behind the modification is noted and stored along with the corresponding modification in the library, as shown at blocks 408 and 410. For example, if the word BLACK is modified to BLK, the reasoning may be the context of the word: Black was an adjective on the word WIRE, and a standard abbreviation for wire colors may be BLK for BLACK. A second reasoning on the change may be that a desired output device has a limited display functionality or memory capacity, and so the shortening of text is considered to be an important goal. Thus, the reasoning can be related to the desired use or output type of the diagnostic vehicle information.

Similarly, the enhancement of diagnostic vehicle information with a picture may apply to the same text (e.g., BLACK WIRE) when the output type is a color printed manual. In this case, a picture of several wire colors may be presented with an arrow pointing to the black wire. The picture may be a component picture, a factory procedure picture, an animation, a symbol, or other characters, icons, sounds, colors, graphics and/or edits thereof.

Note also that many other modifications can be captured within this method, including the reverse of the example described above: expansion of an abbreviation to the full word, or removal or replacement of a picture with text. Any type of modification and reasoning for making the modification can be imagined based on a desired output device, output type or desired use of the diagnostic vehicle information.

The captured modifications and their associated reasoning are stored in a library of output modifications. The library can be implemented in many forms, one example of which is a relational database. Using the library, new diagnostic vehicle information can be identified, and an intended output type can also be determined. New information can then be automatically processed for suggested transformations. Information in the library has a method of identification associated with it such as meta-tags, or other identifiers, allowing for picture and term identification and searching, for example.

Figure 5:
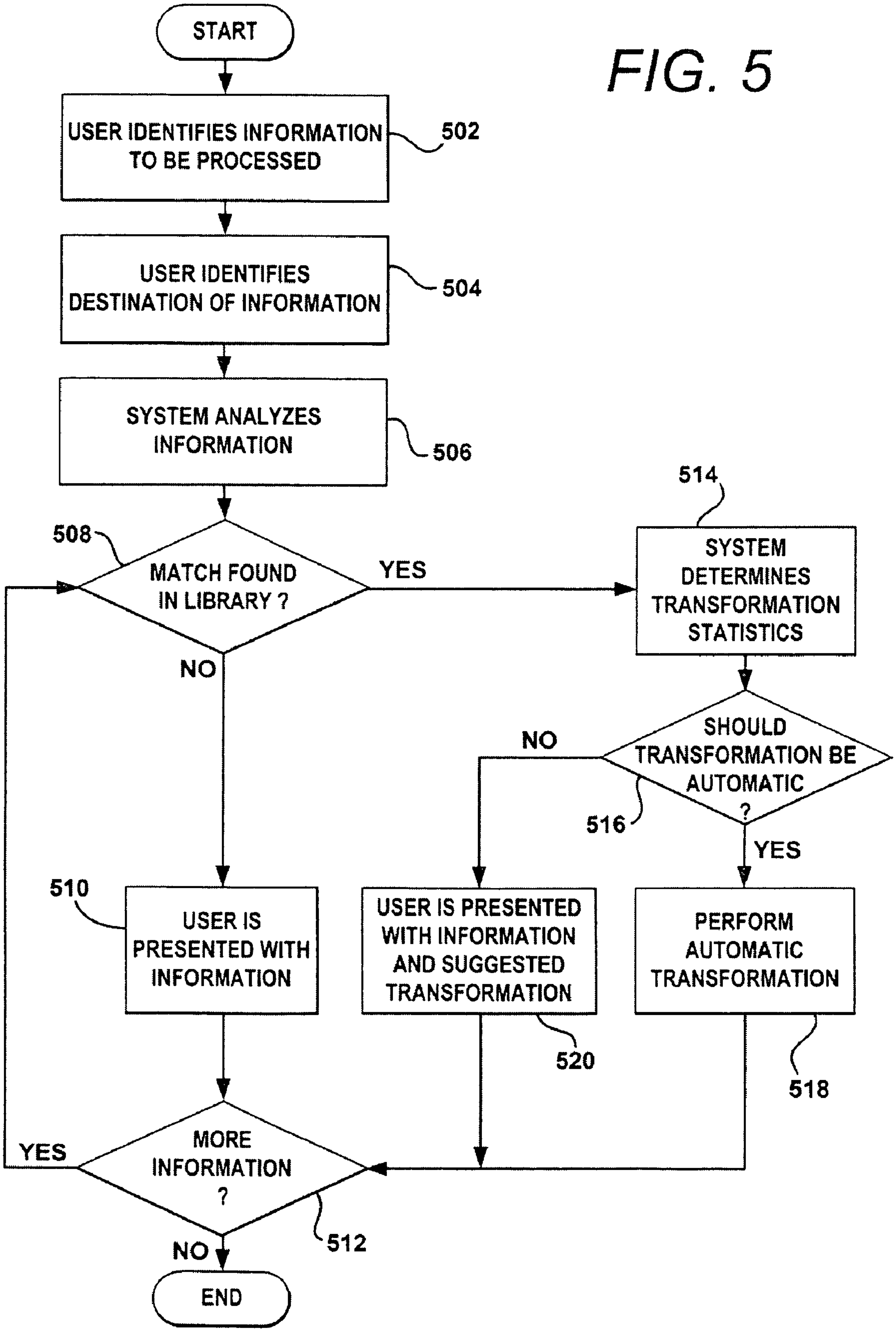
FIG. 5 is a flowchart depicting one embodiment of a method for optimizing diagnostic

FIG. 5 is a flowchart depicting one embodiment of a method for optimizing diagnostic vehicle information using a library as created by the technique depicted in FIG. 4. The method shown in FIG. 5 may be performed by the system 300.

Initially, as shown at block 502, the system 300 receives diagnostic vehicle information and stores the information in the memory 302. A destination or output type of the information is then determined, as shown at block 504. For example, the information may be for use in a handheld diagnostic device, a computer program or a printed manual. The output type may be determined based on the type of information contained in the diagnostic vehicle information, or based on user input.

Based on the output type, the system 300 analyzes the information searching for possible areas to make modifications for optimization purposes, as shown at block 506. For example, if the information is to be used in a printed manual format, then the system 300 may analyze the information to identify areas where pictures can be added to supplement diagnostic instructions. If the information is to be used in a handheld device, the system 300 may analyze the information to identify words that can be abbreviated or replaced with acronyms, for example.

To do so, the system 300 accesses the library 308 to identify modifications 310 that correspond to the desired output type 312.

For example, the library 308 includes modifications that have been made to previous diagnostic vehicle information and corresponding identifiers, e.g., metatags. The library may be set up as a table such as that below (e.g., Table 2) that illustrates desired modifications for original text depending on an output type. The system 300 will analyze the diagnostic vehicle information and compare text (e.g., words or phrases) in the information with the original text stored in the library 308. Thus, after analyzing the information, the system 300 searches the library for matches corresponding to identified possible modifications, as shown at block 508. If any match is found, the system 300 will note the desired output type to determine the modification to be made to the text. Further, the system 300 may compare any pictures with those identified or stored in the library 308 as well, to identify any possible modifications to be made, such as eliminating the picture altogether for handheld devices, or providing a color photo for PC software outputs, for example.

TABLE 2

| | Modifications | |
|---|---|---|
| | Original Text | |
| Output Type | Black Wire | Perform fuel test using the J 44175 |
| Printed Manual | Insert picture | Insert picture |
| Handheld Device | BLK wire | Fuel Test |
| PC Software | (no change) | Perform fuel test using any generic meter, such as the J 44175 |

Table 2 is only one example, since the information in the library 308 can be in many forms. For example, the library may include a section of modifications for reducing word size, and the section will include abbreviations for words, such as Blk for Black. If an identified possible modification includes abbreviating words, the system 300 will then search the library for the specific word, and if found, the system will then determine the appropriate abbreviation that should be used in order to modify the diagnostic vehicle information. Further, the library can include a section for supplementing text instructions with illustrative pictures as well, or any other number of sections.

If a match for a possible identified modification is not found in the library, the system will present a possible modification to a user, as shown at block 510, and the user can decide whether to make the modification and what modifications to make. Here, when the system identifies unknown words to be abbreviated (and thus they are not within the library), then the user can alter the words accordingly. For example, the first time the system encounters BLACK WIRE within diagnostic vehicle information, nothing will be found in the transformation library, so the text is presented to the user without suggestions. The user can then alter the text from BLACK WIRE to BLK WIRE and continue. This modification is then stored in the library, as discussed in FIG. 4. If more information is present, as shown at block 512, the method is repeated.

If a match for a possible identified modification is found in the library, the system will determine past transformation statistics, as shown at block 514. Each time that the system encounters BLACK WIRE, the system 300 makes note of the occurrence, and after the first time where a user manually inputs a desired modification, the system 300 will then suggest changing the text to BLK WIRE. The system 300 will note whether the suggested change was accepted or rejected. The acceptance/rejection of the transformation is logged, so that over time, the system 300 learns if the transformation is always accepted, only accepted for specific outputs, or is never again used, for example. Acceptance and rejection statistics can be stored in memory, as shown in FIG. 3 as transformation statistics 314, and based on the statistics the system 300 will determine when to automatically make the change without consulting a user, thus making the transformation fully automatic, as shown at block 516.

For any given transformation, if the statistics are greater than 75% in favor of making the change (e.g., in past situations, 75% of the time a suggested modification was accepted), the system 300 may automatically modify the diagnostic vehicle information, for example. Any acceptance/ rejection percentage can be selected as a threshold for determining when to automatically perform the transformation. Thus, if the threshold is met for a given modification, the system 300 will automatically perform the transformation, as shown at block 518.

However, if the threshold is not met, e.g., only in about half of the instances the modification is accepted, then the system will present the user with the suggested modification and allow the user to make the decision, as shown at block 520. For example, the diagnostic information editor 306 may access the library 308, and then may bring up corresponding modifications and cause a prompt to be displayed on a device for a developer or user to choose whether or not to substitute the modification for the original text in the diagnostic vehicle information. For each item to be replaced, the developer or user may choose whether or not to adopt these changes by entering a command into the system 300, for example.

Note that while the present application has been described in the context of a fully functional system for modifying diagnostic vehicle information, those skilled in the art will appreciate that mechanisms of the present application are capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

While examples have been described in conjunction with present embodiments of the application, persons of skill in the art will appreciate that variations may be made without departure from the scope and spirit of the application. For example, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

What is claimed is:

1. A computer readable medium having stored therein instructions executable by a computing device to cause the computing device to perform the functions of:

receiving diagnostic vehicle information including at least one procedure for diagnosing a cause of a fault that is experienced by an apparatus under diagnosis;

identifying textual modifications that have been made to the diagnostic vehicle information;

storing in a library of transformations the textual modifications made to the diagnostic vehicle information;

identifying an intended output type of the diagnostic vehicle information;

for each textual modification, identifying a reason for making the textual modification within the diagnostic vehicle information, wherein identifying the reason includes abbreviating text in the diagnostic vehicle information, expanding an abbreviation of text in the diagnostic vehicle information, removing a picture from the diagnostic vehicle information, or inserting a picture into the diagnostic vehicle information; and storing in the library of transformations an identifier for each textual modification indicating (i) the reason for making the textual modification and (ii) the intended output type of the diagnostic vehicle information within which to make the textual modification.

2. The computer readable medium of claim 1, further comprising a user reviewing the diagnostic information and making the modifications.

3. A computer readable medium having stored therein instructions executable by a computing device to cause the computing device to perform the functions of:

receiving diagnostic vehicle information including at least one procedure for diagnosing a cause of a fault that can be experienced by an apparatus under diagnosis;

identifying an intended output type for which the diagnostic vehicle information will be used;

searching within a library for textual modifications to make to the diagnostic vehicle information based on the intended output type;

presenting a user with suggested textual modifications to make substitutions to the diagnostic vehicle information;

creating transformation statistics indicating when the user agrees with the suggested textual modifications by recording whether the user accepts the suggested textual modifications to be made to the diagnostic vehicle information; and wherein if the transformation statistics for a given textual modification exceed a predetermined threshold, automatically modifying the diagnostic vehicle information using the suggested textual modification.

4. The computer readable medium of claim 3, further comprising adaptively learning to automatically modify the diagnostic vehicle information.

5. The computer readable medium of claim 3, wherein the intended output type for which the diagnostic vehicle information will be used includes a handheld diagnostic device, a computer program and a printed manual.

6. The computer readable medium of claim 3, wherein identifying the intended output type for which the diagnostic vehicle information will be used comprises receiving user input indicating the intended output type.

7. The computer readable medium of claim 3, wherein searching within the library for textual modifications to make to the diagnostic vehicle information comprises comparing text within the diagnostic vehicle information with textual modifications in the library.

8. A method comprising:

receiving diagnostic vehicle information including at least one procedure for diagnosing a cause of a fault that is experienced by an apparatus under diagnosis;

identifying an intended output type for which the diagnostic vehicle information will be used;

identifying within a library, textual modifications to make to the diagnostic vehicle information based on the intended output type;

for identified textual modifications, determining modification statistics, the modification statistics indicating whether a given textual modification should be accepted based on past experience;

based on the modification statistics, modifying the diagnostic vehicle information according to the identified textual modifications; accepting the identified textual modifications if the modification statistics are above a predetermined threshold; and rejecting the identified textual modifications if the modification statistics are below a predetermined threshold.

9. The method of claim 8, further comprising:

presenting the identified textual modifications to a user; and the user determining whether to accept the identified textual modifications.

10. The method of claim 8, wherein the modification statistics indicate whether a textual modification is always accepted, is only accepted for specific outputs, or is never accepted based on past experience.

11. The method of claim 8, wherein modifying the diagnostic vehicle information includes abbreviating text in the diagnostic vehicle information, adding pictures or animations to the diagnostic vehicle information, adding hypertext links in the diagnostic vehicle information, or expanding a word in the diagnostic vehicle information.

12. The method of claim 8, further comprising creating the modification statistics.

13. The method of claim 12, wherein creating the modification statistics comprises recording whether a user accepts suggested modifications.

* * * * *